United States Patent

Schwager et al.

[11] Patent Number: 5,219,036
[45] Date of Patent: Jun. 15, 1993

[54] NAVIGATION SYSTEM AND PROCESS FOR GUIDING UNMANNED INDUSTRIAL TRUCKS WITHOUT GUIDE WIRE

[75] Inventors: Jürgen Schwager, Pfullingen; Gerhard Sommer, Kohlberg; Michael Dongus, Jettingen, all of Fed. Rep. of Germany

[73] Assignee: Wagner Fordertechnik GmbH & Co., Reutlinger, Fed. Rep. of Germany

[21] Appl. No.: 918,666

[22] Filed: Jul. 22, 1992

Related U.S. Application Data

[62] Division of Ser. No. 503,869, Apr. 3, 1990, Pat. No. 5,154,248.

[51] Int. Cl.⁵ ............................................. B62D 63/00
[52] U.S. Cl. ................................. 180/168; 180/169; 318/587; 364/424.02
[58] Field of Search ............... 180/167, 168, 169; 318/587, 586; 364/424, 425, 424.01, 424.02; 356/1, 4, 141, 152

[56] References Cited

U.S. PATENT DOCUMENTS

| | | | |
|---|---|---|---|
| 4,780,817 | 10/1988 | Lefgren | 180/168 |
| 4,884,202 | 11/1989 | Ogawa et al. | 180/168 |
| 5,029,088 | 7/1991 | Minami | 180/168 |
| 5,031,101 | 7/1991 | Kamimura et al. | 180/168 |
| 5,052,799 | 10/1991 | Sasser et al. | 180/168 |
| 5,083,629 | 1/1992 | Chang | 180/168 |

*Primary Examiner*—Richard M. Camby
*Attorney, Agent, or Firm*—McGlew and Tuttle

[57] ABSTRACT

A navigation system for guiding unmanned vehicles with any desired wheel configuration without guide wire for free movement on paths and along curves along a virtual reference path having at least one straight and/or curved section. Discrete elements are floor-installed which are in operative connection with a vehicle internal path control device via the vehicle's internal sensory analysis system for correcting the course of the industrial truck. The discrete elements are arranged at spaced locations exclusively along the area of the reference path forming a linear formation chain as navigation reference points P. The distance between the reference points P are either regular or irregular and may be relatively great distances equal to a multiple of the wheel base of the vehicle. The on-board sensory analysis system exclusively determines the distances and measures the distance between the longitudinal axis of the industrial truck and the navigation reference point P.

9 Claims, 6 Drawing Sheets

NAVIGATION SYSTEM AND PROCESS FOR GUIDING UNMANNED INDUSTRIAL TRUCKS WITHOUT GUIDE WIRE

This is a divisional of application Ser. No. 07/503,869 filed Apr. 3, 1990 now U.S. Pat. No. 5,154,298.

FIELD AND BACKGROUND OF THE INVENTION

The present invention pertains to a navigation system and process for self-guiding unmanned industrial trucks with any desired wheel configuration, without a guide wire, and for free movement on paths and in curves along a virtual reference path. The path having at least one straight and/or curved section, wherein floor-installed discrete elements are provided which are in operative connection with the vehicle's internal control device via the vehicle's internal sensory analysis system.

It has been known for many years that the traffic lanes of unmanned industrial trucks can be marked by current-carrying wires in the traveled floor surface and that these wires can be inductively scanned by means of the vehicle's internal sensors or coils for finding the lane. This technology, called "industrial guiding", has a particular disadvantage that construction of the traveled sections requires expensive mechanical and electrical preparation of the floor, e.g., the milling of grooves, laying of wires, pouring out and grinding of the grooves, etc., in order to install the inductive lane loops in the floor surface. Fully aside from the often undesired damage to new shop floors which occurs in this connection, the time and cost involved are in many cases unacceptable.

Another method for guiding unmanned industrial trucks on predetermined guide paths is known as dead reckoning navigation. This consists in composing the paths of plurality of short, straight section elements which, when placed next to each other, represent a polygonal course. Steering is influenced such that each section element is traveled with the industrial truck having a defined steering angle through that section. By establishing a mathematical or trigonometric connection between the speed traveled s and the actual steering angle values $\alpha$, it is possible to calculate the change in the spatial position of the industrial truck. It has been clearly established that in practice there is an essential disadvantage to this principle of guiding. The calculation of the spatial position of the industrial truck is according to dead reckoning navigation, based on a starting point and the instantaneous position is subject to an inaccuracy which increases over the entire travel section. This is caused by a plurality of parameters that are not taken into account, e.g., unevennesses of the floor, vehicle tolerances, inexactitude of the angle and displacement measurements, etc. Since it is usually impossible in practice to accurately determine all the parameters which cause the error because of the costs and apparatuses which such measurements would require, free travel sections without guiding medium can be realized according to this principle of dead reckoning navigation only over short lengths ranging from 5 to a maximum of 10 m.

Experience showing that navigation along longer sections requires measurement of the ambient conditions is based on the above. In consideration of these relationships, distance sensors based on ultrasound or laser beams for scanning room walls or spatial distance marks, or optical sensors, for example, laser scanners, for scanning guide beams or bar codes arranged in space, have been suggested. These methods require that the actual measuring sections between the industrial truck and the room walls or the spatial marks be always free, and they must not be disturbed and consequently interrupted by persons, other vehicles, objects, or merchandise. Therefore, the conditions occurring in production and material handling facilities permit the use of this method in very few cases only.

The discovery that this disadvantage can be avoided by scanning floor marks was already taken into account in European Paten Application No. 0,193,985. It was suggested in this application that the floor serving as a travel surface be provided in the area of the traffic lanes with a geometric surface grid of marking elements which are scanned by means of a sensory analysis system arranged in the front part of the vehicle, and the values thus determined are trigonometrically linked for steering correction and guiding of the industrial truck. The relatively short grid distance between the individual marking elements, which approximately corresponds to the width of the vehicle, ensures independence of the path to be traveled from the geometric marking grid, as a result of which the path may extend in any preselectable pattern. However, the stationary floor installation of the marking points of the geometric surface grid, whose number may reach several hundred, depending on the existing space conditions and the length of the course to be traveled, represents an absolute maximum of expenditure in terms of means and cost, which is acceptable only in individual cases in which continuously varying travel courses are required. However, this undoubtedly represents an exception, because the trucks usually have to travel on fixed travel courses between existing production facilities and machines. Aside from this, due to the geometric surface pattern of the grid points needing absolutely equal distances between them, a pattern which is to be strictly maintained, and the absolutely perpendicular arrangement of the vertical and horizontal lines formed by the individual grid points in the surface, the floor installation of the marking elements requires utmost precision and care on the part of the installers. This is ultimately reflected in enormous costs.

SUMMARY AND OBJECTS OF THE INVENTION

Based on this state of the art, it is an object of the present invention to provide—on the smallest possible floor space, using the smallest possible amount of materials and at the lowest possible cost—a navigation system and process for determining and changing the travel course of self-guided industrial trucks. Also a navigation system and process which is not susceptible to malfunction under external effects, and wherein the system is based exclusively on the floor without requiring continuous guiding lanes or multidimensional geometric guide patterns (surface pattern). The system and process permits free travel with linear and/or curved movements along any mathematically or geometrically definable path with relatively close lane tolerances, and in which the travel course can be preset, expanded, and changed on the site with a minimum amount of mechanical work in connection with the tracing of the travel course with the simplest possible means, and in the shortest possible time.

According to the present invention, the above-described task is accomplished by means of a navigation system including a plurality of floor-installed discrete elements which are in operative connection with an internal path control device of the vehicle. The discrete elements for course correction are arranged at spaced locations exclusively along the area of the reference path forming a linear chain defining a plurality of reference points. The distance between the navigation reference points is either regular or irregular and relatively great and equal to a multiple of the wheel base of the vehicle. An outboard sensory analysis system is provided which exclusively determines distances traveled and for measuring the distance between the longitudinal axis of the truck and the navigation reference point. Data or coordinate values of a nominal reference path are fed into a path guiding computer along with the position of navigation reference points by means of wireless or wire-type meter data coupling via at least one external computer.

The method of the invention includes the storage of nominal path curves in the vehicle and the storage of position coordinates of the navigation reference points relative to a spatially fixed coordinate system x,y as a set of geometric data. The absolute angular position gamma ($\gamma$) of the truck in the plane is determined by measuring the distance or deviation $d_i$ between the longitudinal axis of the industrial truck and the center point of a navigation reference point p at two consecutive navigation reference points $P_i$ and $P_{i+1}$. The geometric data received from the external computer is transformed on board into correction paths by means of the deviation $d_i$ between the longitudinal axis of the industrial truck and the center of the navigation reference point P and the angle gamma. These are measured at a navigation reference point $P_i$, with the correction path calculated to exactly meet the next navigation reference point $P_{i+1}$. The vehicle-related nominal instruction values $S_{nominal}$ and $\alpha_{nominal}$ are calculated from the correction paths and at least one steering motor and/or drive motor are programmed with the axis nominal instruction values $S_{nominal}$ and $\alpha_{nominal}$ for travelling to the next navigation reference point $P_{i+1}$. Additional feedback in the space control loop is provided simultaneously with the axis control by the transformation of the axis actual values $S_{actual}$ and $\alpha_{actual}$ into space coordinates x,y, gamma and controlling at least one steering motor and/or drive motor of the industrial truck in the space coordinates. The procedures are continuous during further travel of the industrial truck.

The design according to the present invention offers the following advantages over the state of the art:

no optical scanning of the floor is performed, which ensures insensitivity to soiling or mechanical stress of the floor;

no walls are scanned, as a result of which, application of the present invention is also possible in places where there are no walls (outside use) or where walls cannot be scanned because of obstacles, e.g., other vehicles;

there are no rotating precision parts in the path sensor, as a result of which application is possible even under the hardest conditions;

there are no optical sensors, as a result of which, application is possible even in dusty and dirty air;

there are only a few navigation reference point in the floor, and a navigation module in the industrial truck and these units are very inexpensive.

Further advantageous embodiments and further improvements of the object of the invention will become apparent from the claims and the description.

The various features of novelty which characterize the invention are pointed out with particularity in claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
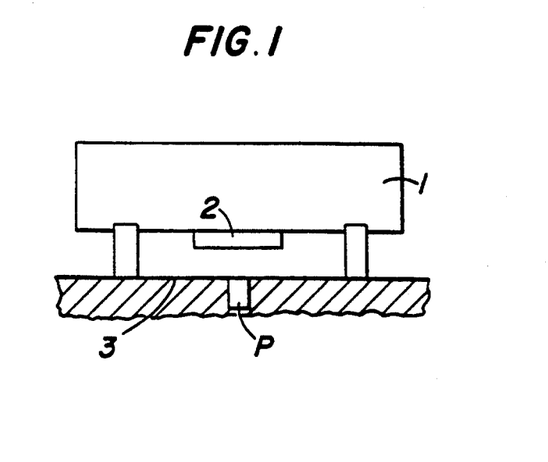
FIG. 1 is a schematic diagram of an industrial truck with the association of the vehicle's internal sensory analysis system with a navigation reference point according to the present invention.

An industrial truck or any self-guided vehicle 1 shown schematically in FIG. 1 is equipped with at least one steering motor and at least one drive motor in the known manner. These are therefore not shown and described in greater detail. The number of steering motors and drive motors used depends on the chassis configuration and the wheel arrangement(s). The lower side of the industrial truck 1 is equipped—preferably in its front area—with a distance-detecting sensory analysis system 2.

As is indicated in FIG. 1, the sensory analysis system 2 is associated with navigation reference points P embedded in the floor 3 for measurement purposes. The reference points form a linear formation chain and are embedded in the floor at spaced locations, so that their surface is flush with the floor surface or is slightly lower. Permanent magnets—preferably in a size of up to 1 cm in diameter—as well as active and/or passive data storage media of an identification system (also called plaquettes, transponders or code carriers) may be used as the navigation reference points P. The navigation reference points P preferably consist of materials that can be scanned inductively.

Figure 2:
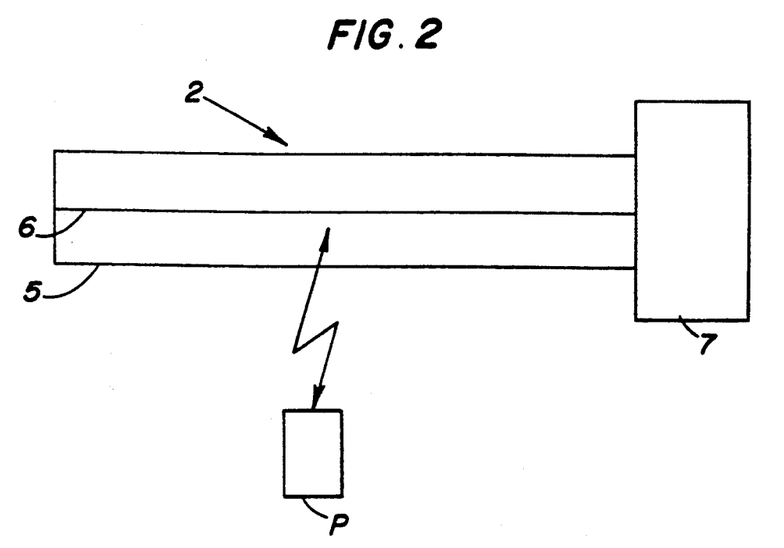
FIG. 2 is a schematic representation of a vehicle's internal ultrasonic distance sensor.

The sensory analysis system shown in the embodiment according to FIG. 2 is preferably designed as ultrasonic distance sensors 2 operating on a magnetostrictive bases. This system operates by utilizing the magnetostrictive effect which is evaluated by ultrasonic travel time measurement for determining the position as will be described below.

The ultrasonic distance sensor 2 consists of a rod 5 which is arranged at right angles to the vehicle's longitudinal axis 4 and in which are tensioned wire 6 is located. A current impulse is sent to the wire 6 by an impulse generator arranged in a schematically indicated sensor control device 7. On passing over a navigation reference point P, which is designed, for example, as a permanent magnet, a magnetostrictive effect appears at the point of the wire 6 which is located above the navigation reference point P. This results in an ultrasound impulse which propagates to the ends of the wire. The travel time of this ultrasound impulse is measured by an evaluating electronic unit incorporated in the sensor control device 7 and represents an indicator of the lateral distance between the vehicle's longitudinal axis 4 and the center of the navigation reference point P. It is thus possible to determine the lateral offset with which the actual navigation reference point P is traversed by the industrial truck 1 in a simple manner.

Even though the principle of the physical measuring effect of such a sensor is know, the discovery that this can surprisingly be used for the free navigation of an industrial truck represents an absolute novelty. The use of other distance-determining sensors, e.g., linear arrays, etc., having a width equal or greater than the greatest determined side tolerance, for distance measurement is, of course, also within the scope of the present invention. However, these are very expensive compared with the ultrasonic distance sensor 2 and require more sophisticated measuring circuits.

Figure 3:
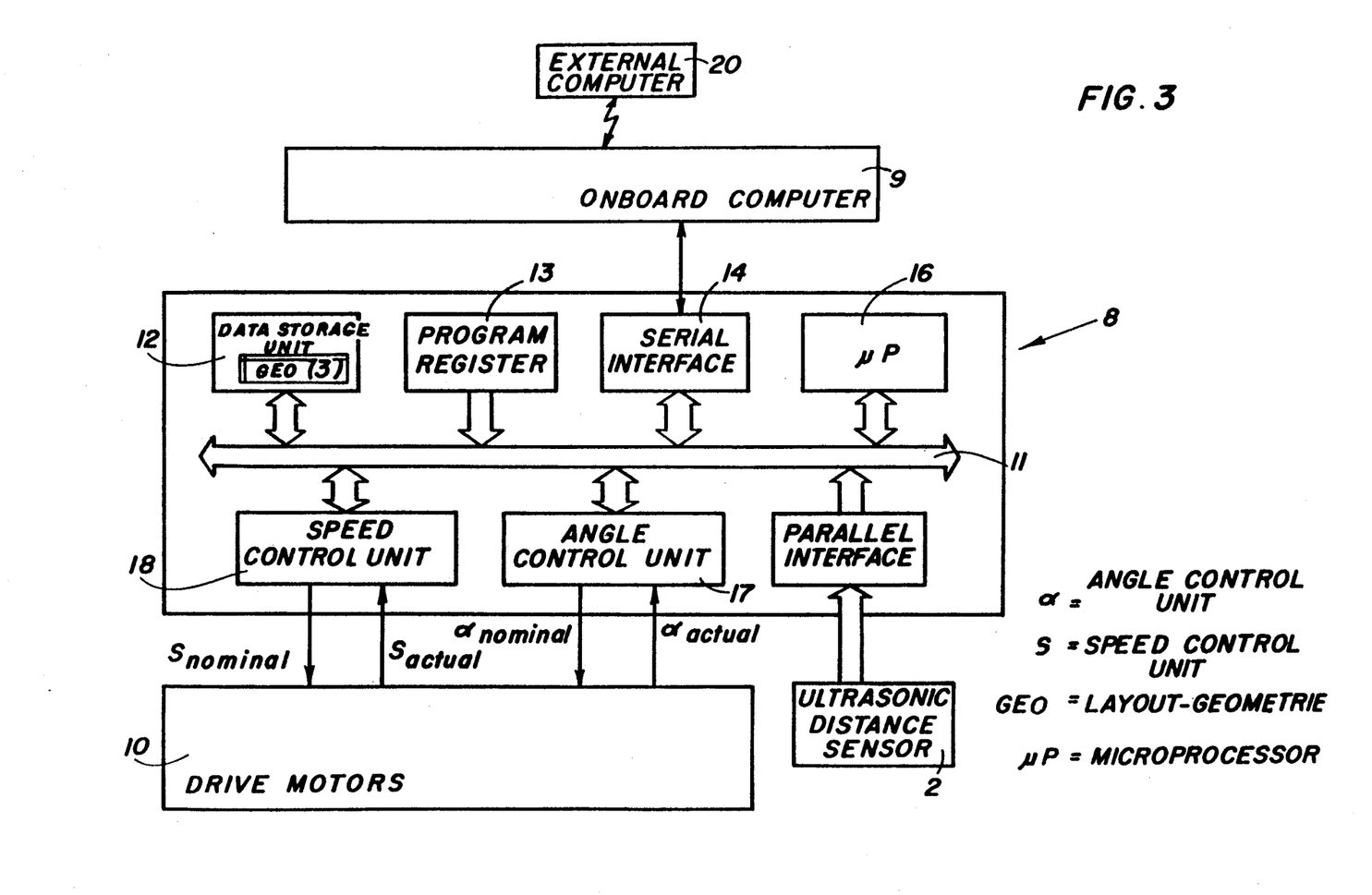
FIG. 3 is a block diagram of the control unit of an industrial truck according to FIG. 1.

According to the block diagram shown in FIG. 3, the control device of the industrial truck consists essentially of a path guiding computer 8, an onboard computer 9, as well as the above-mentioned steering motors and drive motors with their power end stages, which are indicated only schematically with the reference numeral 10. The path guiding computer 9 is equipped with a microprocessor bus 11 to which a data storage unit 12, a program register 13, at least one serial interface 14 and one parallel interface 15, a microprocessor 16, at least one angle control unit 17, and one speed control unit 18 are connected. The speed control unit 18 is data-coupled to the power end stages of the drive motors 10 for receiving measured and transmitting control speed values $s_{actual}$ and $s_{nominal}$. The angle control unit 17 is data-coupled to the power end stages of the steering motors 10 for receiving the measured value $\alpha_{actual}$ and transmitting control value $\alpha_{nominal}$. The ultrasonic distance sensor 2 is connected to the microprocessor 16 via a microprocessor bus 11 for transmitting its measured values via the parallel interface 15. The onboard computer 9 is connected at the serial interface 14 for entering and acknowledging travel instructions.

The onboard computer 9 can be coupled with at least one external computer 20 for wireless and/or wirebound data transmission. The data transmission is for presetting and storing data and/or coordinate position values of the navigation reference points P and/or at least one nominal reference path 19. The external computer 20 is preferably designed as a laptop PC with CAD. This makes it possible for the user of the industrial trucks 1 to generate the travel section or expansions and/or changes of the travel sections and to store them in the data storage unit 12 of the path guiding computer 8.

Figure 4:
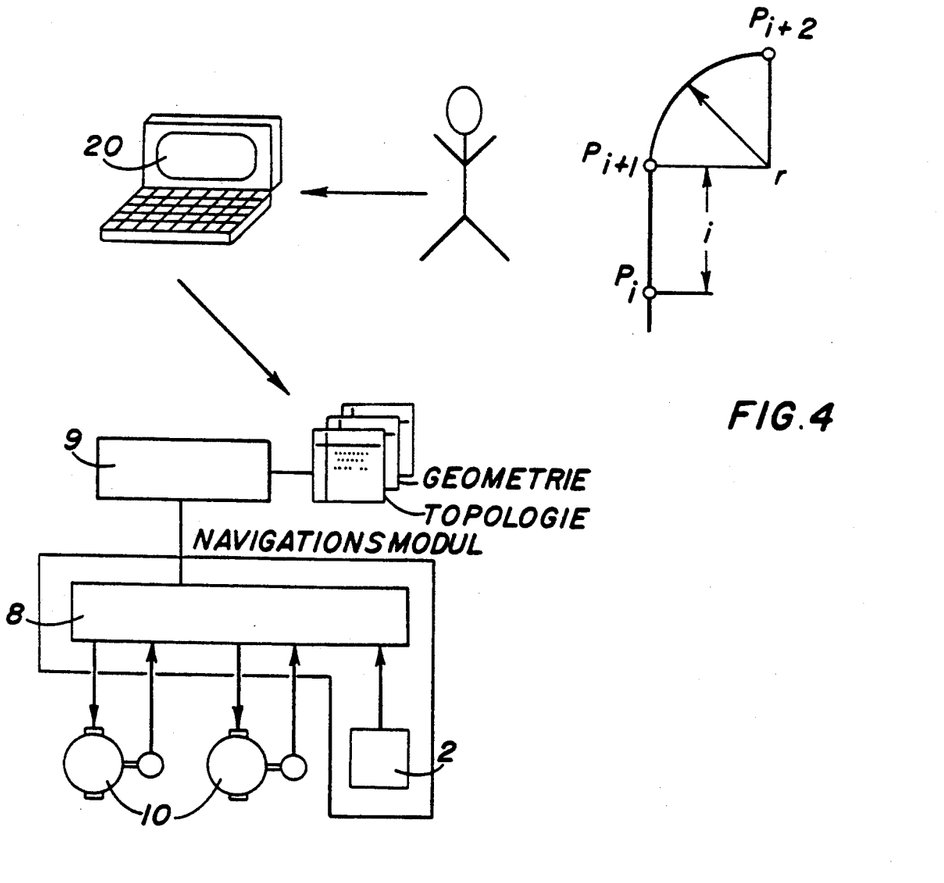
FIG. 4 is a diagram defining the parameters of a travel course geometry, which are to be preset by the user.

FIG. 4 shows a greatly simplified travel course geometry with a definition of the user-defined parameters. This travel course consists of a straight section with length i extending between the navigation reference points $P_i$ and $P_{i+1}$ and a curved section extending between the navigation reference points $P_{i+1}$ and $P_{i+2}$, designed as a curved path with radius r.

Figure 5:
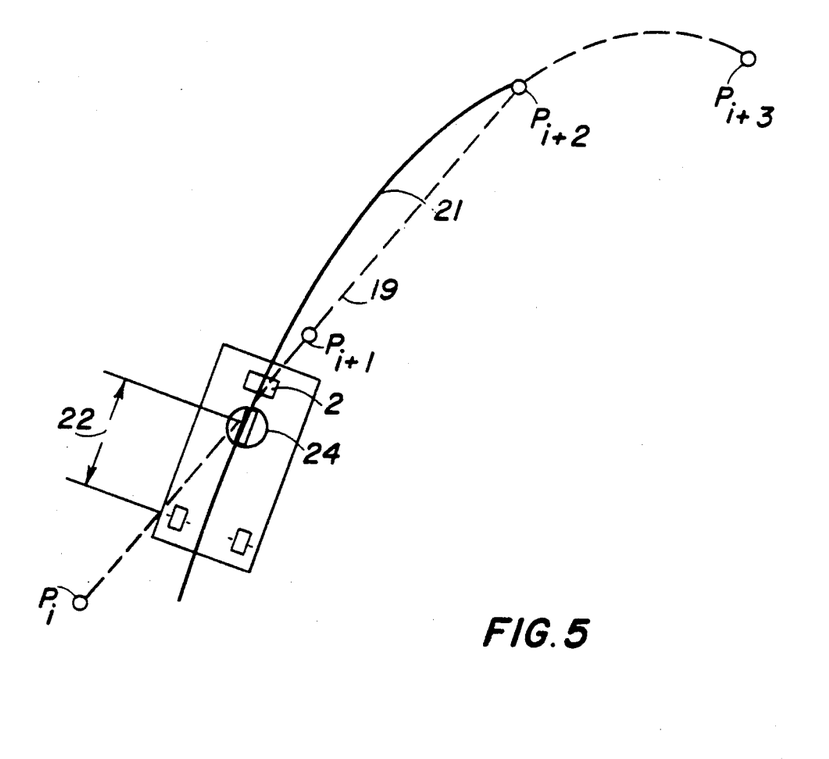
FIG. 5 is a schematic representation of the floor structure of a travel section with a nominal path (reference path) and a correction path with schematic indication of an industrial truck with three-wheel configuration to be moved.

FIG. 5 shows schematically the floor structure of a travel section with a nominal reference path 19 defined by the navigation reference points $P_i - P_{i+3}$ as well as a correction path 21 to the navigation reference point $P_{i+2}$, which is traveled by the industrial truck 1 based on a detected deviation from the nominal reference path 19. It is particularly clearly visible here that the navigation reference points P are arranged, in the area of the planned nominal reference path 19, along the reference path in a linear chain-shaped formation. The distances between the individual navigation reference points P may be selected as being positioned regular and/or irregular distances apart and these distances may be relatively great, which was not possible before. These distances usually equal a multiple of—preferably 4 to 15 times—the wheelbase 22 of the industrial truck 1 and are in the range of between 8 and 30 m.

The linear formation chain of the navigation reference points P may, of course, be formed by a plurality of individual sections which are designed as straight sections, and/or mathematically or geometrically definable curves, that may have any desired curvature, e.g., elliptical segments, parabolic segments, etc.

Figure 6:
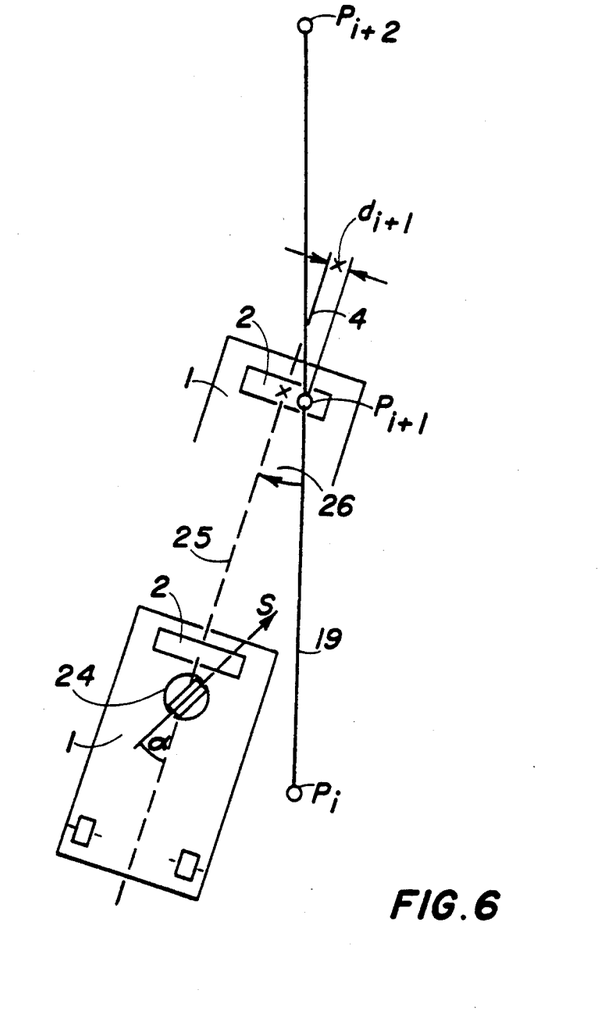
FIG. 6 is a schematic diagram of an industrial truck according to FIG. 1, which is to be moved on the correction path, with angular deviation between an actual path and a nominal path.

The schematic diagram shown in FIG. 6 shows, for example, an industrial truck 1 with a three-wheel configuration and a front steered wheel 24. The industrial truck 1 travels on an actual path 25 with the angular deviation 26 from the nominal reference path 19 formed by the three navigation reference points $P_i$ through $P_{i+2}$, in the direction of the second navigation reference points $P_{i+1}$. The actual path 25 has a lateral distance $d_{i+1}$ between the vehicle's longitudinal axis 4 and the navigation reference point $P_{i+1}$. The steering angle alpha is indicated as only as only an example of a position of the steered wheel 24 that deviates from the direction of the actual path 25. The position of the steered wheel 24 must, of course, be located in the direction of the actual path 25 traveled, which is indicated in dash-dotted line.

Figure 7:
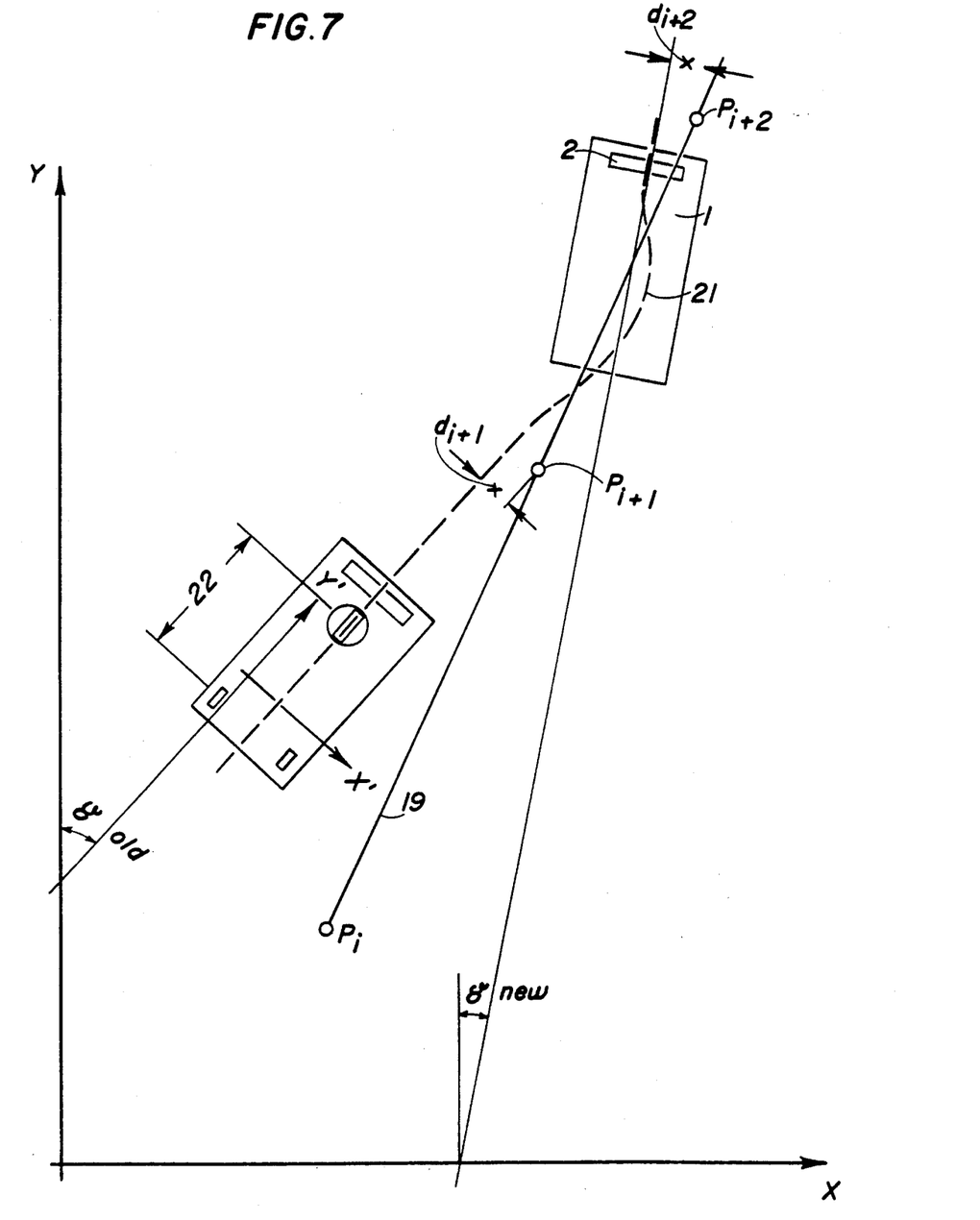
FIG. 7 is a schematic diagram of a compensating movement of an industrial truck according to FIG. 1 between two navigation reference points on an actual curve for course correction with representation of fixed space coordinates and offset space coordinates.

FIG. 7 illustrates the principle of a compensating movement of an industrial truck 1 between the navigation reference points $P_{i+1}$ and $P_{i+2}$, wherein a lateral distance of $d_{i+1}$ is measured while passing over the second navigation reference point $P_{i+1}$ and a lateral distance of $d_{i+2}$ is measured while passing over the third navigation element $P_{i+2}$. Starting from the origin of the space coordinates x, y, the navigation reference point $P_{i+1}$ is passed over in space with the vehicle in the angular position $\gamma_{old}$, and a new correction path 21 is generated on the basis of the new distance value $d_{i+1}$ now measured. The industrial truck 1 performs a compensating movement on this correction path 21, and the correction path 21 traveled should meet the next navigation reference point $P_{i+2}$ as accurately as possible. However, nonmeasurable deviations caused by interfering effects which, again lead to a lateral deviation $d_{i+2}$, appear during this travel.

The mode of action of the navigation system and process according to the present invention will be explained in greater detail below.

The nominal path curves 19 for the unmanned industrial trucks 1 are generated via a CAD system of the external computer 20, and the nominal path curves are stored as a set of geometric data (Geo) in space coordinates in the memory 13 of the path guiding computer 8. The geometric data forms the nominal values for controlling the vehicle. The set of geometric data also contains the coordinates of the navigation reference points P.

These nominal values of the path are first converted into correction paths 21 rather than being immediately converted into vehicle-related nominal values $S_{nominal}$ and $\alpha_{nominal}$. The correction paths 21 are formed on the basis of deviations $d_i$ (not shown) at a reference point $P_i$ so that the correction path 21 exactly meets the navigation reference point $P_{i+1}$. The axis nominal values $S_{nominal}$ and $\alpha_{nominal}$ of the industrial truck 1 are calculated from the correction paths 21 in the path guiding computer 8, and they are sent to the subordinate elements, i.e., steering motors and/or drive motors 10, and used for control.

During the travel from $P_i$ to $P_{i+1}$, there is feedback in the space control loop by converting the actual measured values $S_{actual}$ and $alpha_{actual}$ into space coordinates x, y, $\gamma$, and controlling the steering motors and/or drive motors in space coordinates, in addition to the axis regulation. At the next reference point element $P_{i+1}$, a lateral deviation $d_{i+1}$ occurs as a consequence of the inevitable path deviations. A section $S_{max}$ is preset for each navigation reference point P as a safety function, after which emergency stopping of the industrial truck 1 is induced if the navigation reference point P is not detected.

Knowledge of the actual dihedral angle $\gamma$ is needed to determine the correction path 21. This angle can be determined as follows:

Relative to the system of coordinates x, y, which is fixed in space, a system of coordinates x', y' of the vehicle, which is rotated through the angle $\gamma_{old}$ compared with x, y, is formed during the passage over a navigation reference point $P_i$. As was explained above, the distance $d_i$ is measured by means of the distance sensor 2.

During the travel from $P_i$ to $P_{i+1}$, the components of the distance traveled s in the x' direction and the y' direction are formed. These are designated by $\Delta x'$ and $\Delta y'$. These values are formed by performing a coordinate transformation $$x' = f(s, \alpha)$$
$$y' = f(s, \alpha)$$
$$\gamma' = f(s, \alpha)$$

adapted to the kinematics of the vehicle, wherein the distance traveled s and the steering angle $\alpha$ in the vehicle are measurable. The following equations are now used for a three-wheel vehicle with a point guided in the center of the steered wheel 24:

$$X' = X_o' - \int_o^t s \cdot \sin(\gamma + \alpha) dt$$

$$X' = X_o' - \int_o^t s \cdot \sin(\gamma + \alpha) dt$$

$$\gamma' = \gamma_o' - \int_o^t (1/e) \sin \alpha \, dt$$

The distance $d_{i+1}$ is again measured by means of the distance sensor 2 when passing over point $P_{i+1}$. Both $\gamma_{new}$ and $\gamma_{old}$ can be determined from these values as follows:

$$\gamma_{new} = f(d_1, d_2, x', y', \Delta \gamma')$$

$$\gamma_{old} = f(d_1, d_2, \Delta x', \Delta y', \Delta \gamma).$$

The process described makes it possible to calculate the position of the industrial truck 1 in the space coordinates, i.e., the actual values of x, y, and $\Sigma$ in the path guiding computer 8 by measuring the section traveled s, the steering angle $\alpha$, and the distance values d of the distance sensor 2.

The present invention is clearly not limited to the embodiments shown in the figures and described in the description. Numerous modifications, expansions, and refinements of process steps, as well as design embodiments are evidently also within the scope of the present invention. For example, installing two path sensors in the industrial truck 1 one behind the other, as a result of which greater accuracy of angle measurements are achieved, is conceivable. Arranging two navigation reference points P at relatively closely spaced locations one behind the other in the floor, which substantially simplifies the calculation of the angle, is also within the realm of technical expertise. Finally, using other physical effects by selecting navigation reference points P made of other materials and sensors corresponding to these for the measurement, e.g., sensors operating according to the optoelectronic principle, is also conceivable.

A very particular effect of the navigation system and process according to the present invention is that the user is able to select the floor-embedded arrangement of the navigation reference points perfectly freely by selecting any desired straight and/or nonstraight paths and arbitrarily great distances. Thus, he can install them by taking into account all the machines present and the travel path conditions, e.g., travel path marks, covers for lines and chip canals or chip conveyors, gulleys, etc., without being bound to a defined laying pattern with permanently predetermined distances.

While a specific embodiment of the invention has been shown and described in detail to illustrate the application of the principles of the invention, it will be understood that the invention may be embodied otherwise without departing form such principles.

We claim:

1. A navigation method for a self-guiding vehicle, the method comprising the steps of:
   providing a navigation reference point;
   determining a reference path having said navigation reference point;
   storing said reference path and a position of said navigation reference point in the self-guiding vehicle;

transforming said stored reference path into nominal control values $S_{nominal}$ and $\alpha_{nominal}$;

moving the self-guiding vehicle in response to said nominal control value $S_{nominal}$;

setting a steering angle of the self-guiding vehicle in response to said nominal control value $\alpha_{nominal}$;

measuring actual movement $S_{actual}$ of the self-guiding vehicle measuring an actual steering angle $\alpha_{actual}$ of the self-guiding vehicle;

measuring a deviation between said navigation reference point and the self-guiding vehicle as the self-guiding passes said navigation reference point;

determining if the self-guiding vehicle is away from said reference path;

calculating a correction path to lead the self-guiding vehicle to said reference path if the self-guiding vehicle is away from said reference path, said measured actual movement, said measured actual steering angle and said measured deviation being used for said calculating of said correction path;

transforming said correction path into updated nominal control values $S_{nominal}$ and $\alpha_{nominal}$;

moving the self-guiding vehicle in response to said updated nominal control value $S_{nominal}$;

setting a steering angle of the self-guiding vehicle in response to said updated nominal control value $\alpha_{nominal}$ in order for the self-guiding to navigate.

2. A navigation method according to claim 1, further comprising the steps of:

providing another navigation reference point positioned in said reference path;

storing a position of said another navigation reference point in the self-guiding vehicle;

measuring another deviation between said another navigation reference point and the self-guiding vehicles as the self-guiding passes said another navigation reference point;

calculating an absolute regular position of the self-guiding vehicle from said measured deviation and said another measured deviation; and said another measured deviation and said absolute angular position of the self-guiding vehicle for said calculating of said correction path.

3. A navigation method according to claim 1, wherein:

said measuring of said deviation is between a substantially center of said navigation reference point and a substantially longitudinal axis of the self-guiding vehicle.

4. A navigation method according to claim 1, further comprising the steps of:

providing an external computer;

transforming said reference path into space coordinates with said external computer; and downloading said navigation reference point and said transformed reference path into the self-guiding vehicle.

5. A navigation method according to claim 1, further comprising the steps of: p1 providing a plurality of navigation reference points positioned in said reference path;

storing positions of said plurality of navigation reference points in the self-guiding vehicle;

measuring a deviation between each of said plurality of navigation reference points and the self-guiding vehicle as the self-guiding passes each of said plurality of navigation reference points;

calculating an absolute angular position of the self-guiding vehicle at each of said plurality of navigation reference points, said calculating of said absolute angular position using said measured deviation of a present navigation reference point and a measured deviation of a previous navigation reference point; and using said absolute angular position of the self-guiding vehicle, said measured deviation of said present navigation reference point and said measured deviation of said previous navigation reference point for said calculating of said correction path, and said correction leading to a subsequent navigation reference point.

6. A navigation method according to claim 5, further comprising the steps of:

spacing said plurality of navigation reference points at one of regular and/or irregular distances apart.

7. A navigation method according to claim 5, further comprising the steps of:

presetting at each of said plurality of navigation reference points a safety section $S_{max}$ representing one of a time and/or distance within which a subsequent navigation reference point must be detected; and stopping the self-guiding vehicle if said subsequent navigation reference point is not detected within said safety section $S_{max}$.

8. A navigation method according to claim 5, further comprising the steps of:

transforming said reference path and said position of said plurality of navigation reference points into a set of geometric data in a spatially fixed system of coordinates x, y;

providing additional feedback into a space control loop substantially simultaneously with said moving of the self-guiding vehicle in response to said nominal control value $S_{nominal}$ and said setting of said steering angle of the self-guiding vehicle in response to said nominal control value $\alpha_{nominal}$, said providing of said additional feedback being performed by transforming said measured actual movement and said measured actual steering angle into space coordinates x, y and absolute angular position $\gamma$, and controlling one of said movement and/or said steering angle in dependence upon said space coordinates; and continuously repeating said calculating of said correction path and providing feedback during further travel of the self-guiding vehicle.

9. A navigation method according to claim 8, further comprising the steps of:

continuously calculating space coordinates x', y', $\gamma'$, of the self-guiding vehicle from said $S_{actual}$ and $\alpha_{actual}$ during said moving of the self-guiding vehicle from a present navigation reference point to a subsequent navigation reference point.

* * * * *